(12) United States Patent
Athreya et al.

(10) Patent No.: US 10,200,662 B2
(45) Date of Patent: Feb. 5, 2019

(54) COLOR CORRECTED IMAGES FOR PROJECTORS

(71) Applicant: HEWLETT-PACKARD DEVELOPMENT COMPANY, L.P., Houston, TX (US)

(72) Inventors: Madhu Sud Athreya, Palo Alto, CA (US); Will Allen, Corvallis, OR (US); Syed S. Azam, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/749,466

(22) PCT Filed: Dec. 22, 2015

(86) PCT No.: PCT/US2015/067473
§ 371 (c)(1),
(2) Date: Jan. 31, 2018

(87) PCT Pub. No.: WO2017/111960
PCT Pub. Date: Jun. 29, 2017

(65) Prior Publication Data
US 2018/0227557 A1    Aug. 9, 2018

(51) Int. Cl.
*H04N 9/31* (2006.01)
*H04N 9/77* (2006.01)
(Continued)

(52) U.S. Cl.
CPC .......... *H04N 9/3182* (2013.01); *G06T 5/009* (2013.01); *G06T 7/90* (2017.01); *H04N 5/23229* (2013.01); *H04N 9/3194* (2013.01); *H04N 9/77* (2013.01)

(58) Field of Classification Search
CPC .... H04N 17/002; H04N 17/02; H04N 9/3182; H04N 5/23229; H04N 9/3194;
(Continued)

(56) References Cited

U.S. PATENT DOCUMENTS 7,589,739 B2 * 9/2009 Hasegawa .............. H04N 17/04
345/581
7,639,401 B2 * 12/2009 Bala ..................... H04N 9/3194
358/3.24
(Continued)

FOREIGN PATENT DOCUMENTS

KR    10-200600229    3/2006

OTHER PUBLICATIONS

Bimber et al., "The Visual Computing of Projector-Camera Systems," Eurographics 2007, Mar. 19, 2008, 25 p.
(Continued)

*Primary Examiner* — Sherrie Hsia
(74) *Attorney, Agent, or Firm* — Conley Rose PC (57) ABSTRACT

In example implementations, an apparatus includes a camera, an image signal processor and a display processor. The camera measures metered values of an image projected onto a surface. The image signal processor is in communication with the camera to receive the metered values of the image on the surface. Display parameters are calculated by the image signal processor based on the metered values of the image on the surface that is measured. The display processor is in communication with the image signal processor and a projector. The display processor generates a color corrected image projected onto the surface by the projector. The color corrected image is generated based on the display parameters.

14 Claims, 4 Drawing Sheets

(51) Int. Cl.
*H04N 5/232* (2006.01)
*H04N 17/02* (2006.01)
*G06T 7/90* (2017.01)
*G06T 5/00* (2006.01)

(58) Field of Classification Search
CPC .. H04N 9/77; H04N 9/73; H04N 9/68; H04N 17/00; H04N 9/31; H04N 5/232; G06T 7/90; G06T 5/009
USPC ............... 348/187–189, 744–747, 806, 807; 345/591, 581, 589, 593, 594; 382/162, 382/165, 167
See application file for complete search history.

(56) References Cited

U.S. PATENT DOCUMENTS

| | | |
|---|---|---|
| 8,534,843 B2 | 9/2013 | Yamamura et al. |
| 8,643,662 B2 | 2/2014 | Tran et al. |
| 8,704,859 B2 | 4/2014 | Greenebaum et al. |
| 8,913,194 B2 | 12/2014 | Kim et al. |
| 2002/0075277 A1* | 6/2002 | Naito ............... G09G 3/20 345/589 |
| 2002/0153472 A1 | 10/2002 | Yano |
| 2005/0041139 A1 | 2/2005 | Lowles |
| 2006/0284895 A1 | 12/2006 | Marcu et al. |
| 2008/0218501 A1 | 9/2008 | Diamond |
| 2009/0245690 A1 | 10/2009 | Li et al. |
| 2010/0220247 A1 | 9/2010 | Krogstad et al. |
| 2012/0182276 A1* | 7/2012 | Kee ............... G09G 5/10 345/207 |
| 2015/0015796 A1 | 1/2015 | Stahl |
| 2015/0070337 A1 | 3/2015 | Bell et al. |
| 2015/0089551 A1 | 3/2015 | Bruhn et al. |
| 2015/0222842 A1 | 8/2015 | Kwong |
| 2015/0296203 A1 | 10/2015 | Lucente et al. |

OTHER PUBLICATIONS

Kumar et al., "Adaptive Display Luminance Control for Optimized Contrast Ratio," Proc. of the 2nd Intl. Conf. on Advances in Electronics, Electrical & Computer Engineering, Jun. 18, 2013, 5 p.

* cited by examiner

COLOR CORRECTED IMAGES FOR PROJECTORS

BACKGROUND

Projectors are a popular way to replicate large theater screens for home entertainment or for generating a large display for a meeting. Projectors can be used to generate an image from a media source onto a wall or screen. A projector is generally a pass-through device. In other words, the projector simply receives image data and outputs the image data onto the wall or screen that is received without modification.

DETAILED DESCRIPTION

The present disclosure provides example systems and methods for generating color corrected images for projection systems. For example, currently a projector simply displays whatever image is provided to the projector by a media source. A projector typically projects an image onto a white surface. However, a white surface may not be available and the surface may be another color. Typically, the user may not know how to adjust the display parameters of the projector, or the media source, to adjust the projected image to improve the projected image that is displayed onto a non-white colored surface.

In addition, a user can manually set various parameters such as brightness when the image is initially projected. However, over time the lighting conditions may change within the room that the user is watching the projected image. For example, the user may begin viewing the projected image during the day, but over the course of a few hours the sun may set and the room may become dark. In another example, the user may begin viewing the projected image with the shades open on a sunny day, but then the shades may be closed while viewing the projected image. In another example, the user may begin viewing the projected image in the dark, but then someone may turn on lights in the room, and so forth.

Another factor that can affect a user's viewing experience is the type of image content. For example, different types of images may have different optimizations. For example, the amount of adjustment required to display a bar chart, a solid color or text on a non-white colored surface may be different from a face, cinematic movie, and so forth.

Yet another factor that can affect a user's viewing experience may be user preferences. For example, some users may prefer brighter images with less contrast, while other users may want more contrast with a reduction in average brightness.

Examples of the present disclosure measure metered values of the projected image on the surface and the environment and generate a color corrected image based on the measured metered values. The measurements may be taken continuously and the color corrected image may be continuously, or periodically, generated. In addition, the type of image and the user preferences may be taken into account when adjusting the projected image based on the measured metered values. Thus, a user's viewing experience may be maximized irrespective of a color of the surface that the image is projected onto.

Figure 1:
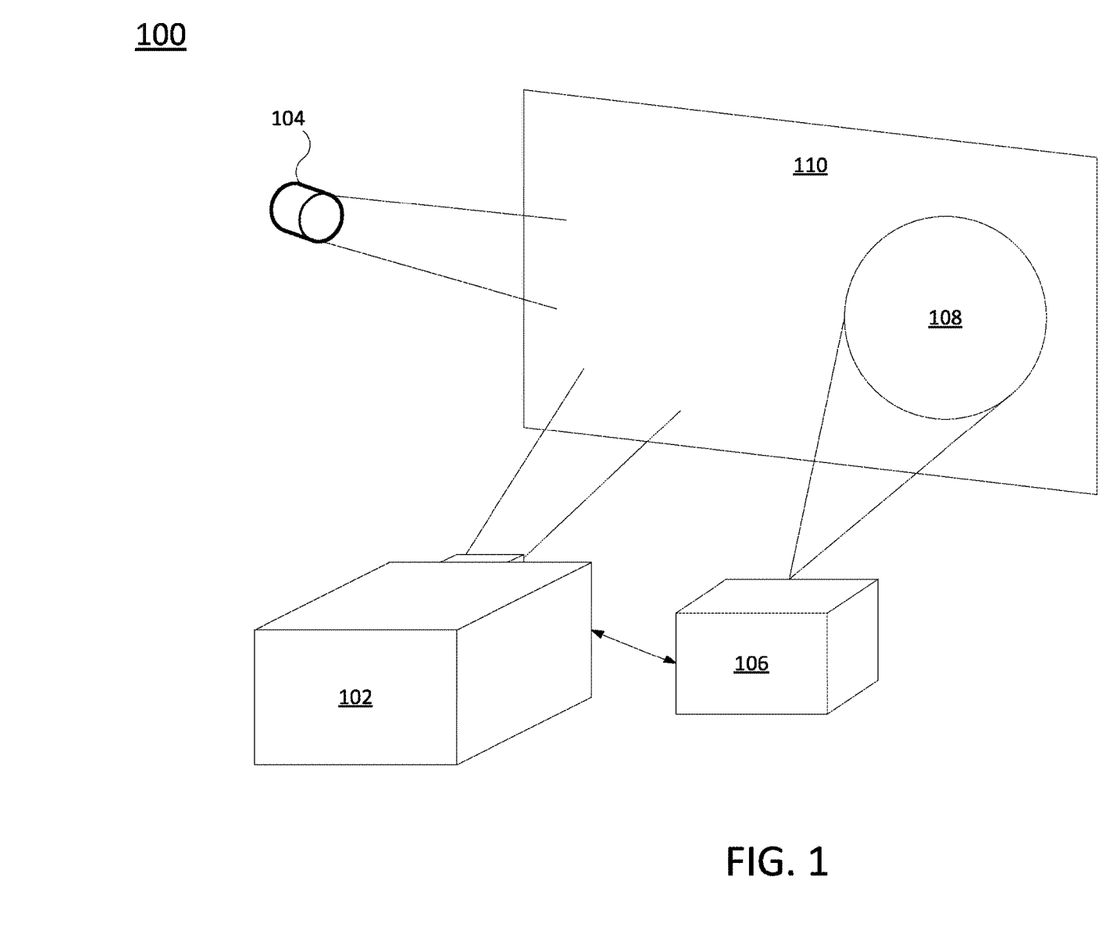
FIG. 1 is a block diagram of an example system of the present disclosure.

FIG. 1 illustrates an example system 100 of the present disclosure. The system 100 may include a media hub 102, a projector 106 and a surface 110. In one example, the surface 110 may be a wall, a screen, and the like. In one example, the surface 110 may be a colored wall. In other words, the surface 110 is a non-white colored wall (e.g., an off-white color, tan, beige, yellow, red, green, blue, and the like). In another example, the surface 110 may be a heterogeneous surface. In other words, the surface 110 may have different colors and textures (e.g., when the surface 110 is a bulletin board).

When the surface 110 is a colored wall or a heterogeneous surface, the projected image may not appear correctly to the user. For example, most images or videos are generated based on an assumption that the image will be projected onto a white wall or a white screen. However, when images or videos are projected onto a colored wall, the color of the wall may cause the characteristics of the image or video to change. Thus, the image or video may not appear correctly to the user (e.g., contrast may be off, colors may appear incorrectly, and the like).

The media hub 102 may be any media generating device (e.g., a Blu-ray disc player, a digital media player, a video game console, a computer, and the like). The media hub 102 may be a source of the images or videos that are displayed by the projector 106. The media hub 102 may transmit images to be projected to the projector 106 via a wired or wireless connection. For example, the media hub 102 may be connected via a high definition media interface (HDMI) cable, a universal serial bus (USB) cable, a digital video interface (DVI) cable, a wireless fidelity (Wi-Fi) connection, a Bluetooth connection, and the like.

In one implementation, the media hub 102 may be inside, or be part of, the projector 106. In other words, the media hub 102 and the projector 106 may be combined as a single device. As a result, the media huh 102 and the projector 106 may be connected via internally wired connections or an internal communication bus.

In one example, the media hub 102 may measure metered values of the surface 110 and the environment (e.g., a room that the media hub 102 and the projector 106 are located). For example, when the surface 110 is a colored wall, the metered values of the image on the colored wall may be measured so that the image can be corrected to compensate for the colored wall. For example, a white color on a tan colored wall may appear to have an off-white color, a gain level may appear to be higher when the video is projected onto a dark colored wall, and the like.

In addition, as the image or the video is playing and being projected onto the surface 110, the lighting conditions in the environment may change. Changes to the lighting conditions can further exacerbate distortions to the image or video characteristics when projected onto a colored wall.

Figure 2:
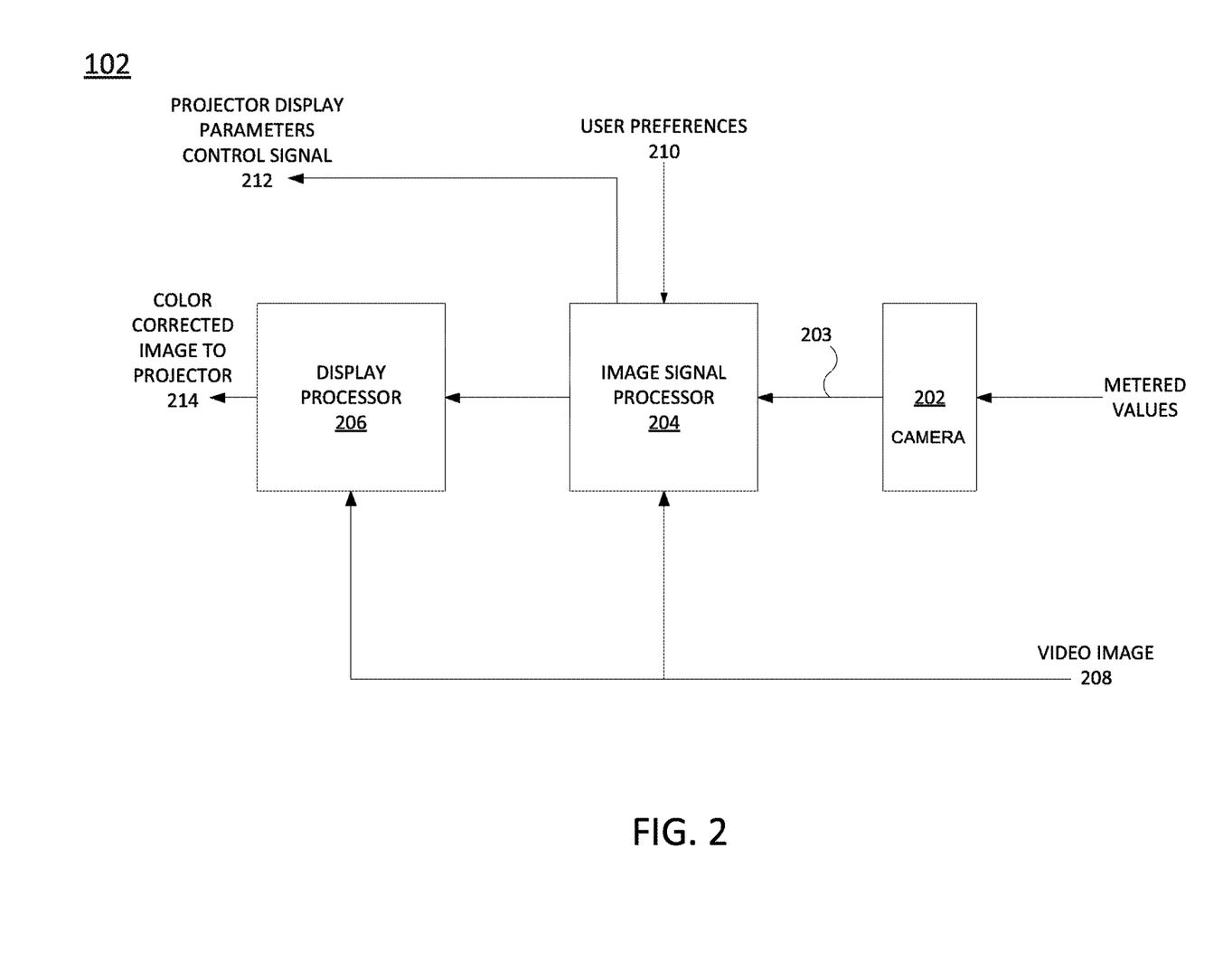
FIG. 2 is an example of an apparatus of the present disclosure.

In one example, the media hub 102 may use a local camera (e.g. a camera attached to the device as shown in FIG. 2 below) or a remote camera 104. Although a single remote camera 104 is illustrated, it should be noted that any number of remote cameras 104 may be deployed.

In one implementation, different remote cameras 104 may be dedicated to different measurements. For example, a first remote camera 104 may look at projected light pixel by pixel or region by region, a second remote camera 104 may measure when the image is not projected to get a baseline from the surface 110, and so forth.

The measured metered values may be processed by the media hub 102 to generate a color corrected image 108. The color corrected image 108 may be transmitted to the projector 106 and projected onto the surface 110. In some implementations, the media hub 102 may adjust display settings to generate the color corrected image 108. For example, the media hub 102 may adjust the display settings over the wired or wireless connection to the projector 106. Alternatively, the display settings may be transmitted to the projector 106 with the color corrected image and the projector 106 may adjust display settings based on the display parameter adjustments that are received from the media hub 102.

In some implementations, when the surface 110 is a heterogeneous surface, the media hub 102 may generate localized color corrected images 108. In other words, the measured metered values may be different for different portions of the heterogeneous surface. As a result, the color corrected image 108 may be different for different areas of the color corrected image 108 depending on where the color corrected image 108 is projected onto the heterogeneous surface.

In some implementations, the light source could be a single light source. In other implementations, there may be multiple light sources and the surface 110 may be illuminated with mixed light sources. For example, some light sources may be a natural light source from an open window and other light sources may be from a light bulb, or other artificial light source.

FIG. 2 illustrates a block diagram of an example media hub 102. The media hub 102 may include a camera 202, an image signal processor 204 and a display processor 206. In one example, the image signal processor 204 may also be referred to as a compute, analyze and generate optimizations processor. In one example, the display processor 206 may also be referred to as an in-line real-time video processor. Although the image signal processor 204 and the display processor 206 are illustrated as separate processors in FIG. 2, it should be noted that the image signal processor 204 and the display processor 206 may be deployed as a single processor within a system on a chip (SOC).

In one example, the camera 202 may include a complementary metal oxide semiconductor (CMOS) sensor that is used to meter the light and to capture the images that are projected onto the surface 110. The camera 202 may capture the video and may measure the metered values of an image projected onto the surface 110 and the lighting within the room. As discussed, in some examples the camera 202 may measure the metered values of the image projected onto different areas of the surface 110 for a heterogeneous surface.

The measured metered values may include a luminance value, a chrominance value, or any other color or light parameter that can be measured. The measured metered values may be recorded as part of an image frame data. These values may be read by the image signal processor 204. The image signal processor 204 may extract the measured metered values and express them to an intelligent software (SW) system (not shown). For example, the intelligent SW system may see a clear glass of water in a red light. In such an example, the output of the red cast is removed making the rendering seem natural. As a result, the intelligent SW system when presented with a clear glass with red wine under day light may not confuse the red wine for red light and renders the image without change.

The intelligent SW system may be a camera white balance software that can be modified for the present disclosure. For example, the intelligent SW system may be modified to understand color walls similar to the example of the glass of water and red wine described above to make proper decisions.

In one implementation, the intelligent SW system may process the measured metered values and output information that is fed back to the image signal processor 204. With the information from the intelligent SW system, the image signal processor 204 may proceed with subsequent processing stages including color correction and color space conversion. With the information from the intelligent SW system, the media hub 102 may generate the color corrected images and a projector display parameters control signal to compensate for the variances of the measured metered values from the surface 110.

In one example, the camera 202 may sample every frame of the video image that is captured. In other words, the camera 202 may continuously capture a video image that is being projected by the projector 106 onto the surface 110 and meter the light of each frame of the video image that is captured.

The measured metered values may then be fed to the image signal processor 204 as an input 203. In some implementations, the image signal processor 204 may also receive the measured metered values from the remote camera 104. The measured metered values may then be averaged for calculating the display parameters, as discussed below. The image signal processor 204 may be a discrete processor or a built-in processor (e.g., part of the main processor of the media hub 102). In one example, the image signal processor 204 may be deployed as an application specific integrated circuit (ASIC) chip.

The image signal processor 204 may convert the measured metered values into display parameters. The display parameters may include a white balance, a gain, an exposure level, and like. In other words, the image signal processor 204 may use the measured metered values to calculate the display parameters.

In one implementation, the image signal processor 204 may also receive an input 208 of a video image that is being projected and an input 210 of user preferences. The image signal processor 204 may use the input 208 of the video image to determine a type of video image that is being projected. As described above, the type of video image may affect the values of the display parameters determined by the image signal processor 204.

In addition, the image signal processor 204 may use the input 210 of the user preferences to further adjust the display parameters. For example, the user preferences may divert from the display parameters determined by the image signal processor 204. For example, the image signal processor 204 may alter a white balance based on the input 203 of the measured metered values, but may further alter the white balance to meet a desired level of brightness, contrast, saturation, color balance, and the like, specified in the user preferences.

It should be noted that adjusting the display parameters based on the input 208 of the video image and the input 210 of the user preferences may be an example implementation. In other words, in other implementations, the image signal processor 204 may convert the input 203 of the measured metered values into the display parameters without using the input 208 of the video image or the input 210 of the user preferences. However, any combination of the input 203 of the measured metered values, the input 208 of the video image and the input 210 of the user preferences may be used to determine the display parameters.

In one example, if the projector 106 has display settings, the image signal processor 204 may send a projector display parameters control signal as an output 212. The output 212 may control various display settings of the projector 106 to display the color corrected image 108. For example, the output 212 may be provided in addition to the color corrected image 108 generated by the display processor 206, as described below.

The display parameters may be sent to the display processor 206. The display processor 206 may be an image display processor for the media hub 102 that generates the color corrected image based on the display parameters calculated by the image signal processor 204. For example, the display processor 206 may compare the display parameters to reference display parameters. For example, the media hub 102 may include reference display parameters for how an image should appear (e.g., a preferred white level, a preferred gain level, a preferred exposure level, a preferred contrast, a preferred brightness, and the like). The reference display parameters may be pre-defined based on an industry standard or may be user-defined (e.g., a user may establish his or her preferences during an initial set-up process of the media hub 102).

In one example, each display parameter may be compared to a respective reference display parameter to calculate a delta. If the delta is greater than a predefined threshold for a particular display parameter compared to a respective reference display parameter, then the display processor 206 may adjust at least one display setting to adjust a particular display parameter for the image such that the delta is within the predefined threshold. Each display parameter may be compared to the respective reference display parameter and adjusted if the delta is greater than the predefined threshold to generate the color corrected image 108.

For example, an image or a video projected onto a surface 110 that is white may be expected to have a particular white balance and a particular gain. However, when the image or the video is projected onto a surface 110 that is a non-white colored wall, the white balance and the gain for the projected image or video may be distorted. Thus, the display parameters calculated by the image signal processor 204 may be out of range of what the display parameters are expected to be had the image been projected onto a white colored wall. The comparisons may determine an amount of distortion of the display parameters and adjust the display settings to bring the display parameters close to the reference display parameters.

The predefined threshold may be an absolute value. In other words, the adjustment may be made based on whether the particular display parameter is less than the respective reference display parameter or greater than the respective display parameter.

In some examples, the display setting may be directly correlated to the display parameter. For example, the media hub 102 or the projector 106 may have a gain setting to adjust the gain to the calculated gain. In another example, the display setting may not be directly correlated to the display parameter. For example, there may be separate red, green and blue settings to adjust a white balance to the calculated white balance.

In one implementation, the display processor 206 may continuously generate the color corrected image 108. In other words, the display processor 206 may also continuously generate the color corrected image 108 based on the display parameters received from the image signal processor 204. In another implementation, the display processor 206 may generate the color corrected image 108 for a predefined number of frames (e.g., every 500 frames, every 1000 frames, and the like).

In one implementation, the display processor 206 may also receive the input 208 of the video image. The display processor 206 may generate the color corrected image 108 by applying the display parameters to the input 208 of the video image. The color corrected image 108 may then be transmitted to the projector 106 as an output 214.

In another example, the display processor 206 may adjust the video image received via the input 208. For example, the display parameters may be applied to the video image by adjusting the video image directly. For example, the gamma on an R channel of the video image may be adjusted by the display processor 206. The color corrected image 108 may then be transmitted to the projector 106 as the output 214.

It should be noted that both the display settings may be adjusted to bring the display parameters within the threshold value of the reference display parameters, the video image can be directly adjusted or both adjustments can be made. In one example, when both adjustments are implemented the adjustment to the display parameters may be sent as a separate output 212 to the projector 106 from the color corrected image that is sent as the output 214 to the projector 106. In other implementations, the display parameter adjustments and the direct adjustments to the video image may be multiplexed together as a single output 214 that is sent to the projector 106.

In one implementation, the image signal processor 204 and the display processor 206 may be modified to work together. For example, the image signal processor 204 and the display processor 206 are not usually located within the same device. As a result, the image signal processor 204 and the display processor 206 may have different gamma curves for correcting images. However, the present disclosure may adjust the gamma curves to be the same for the image signal processor 204 and the display processor 206. In other words, the image signal processor 204 and the display processor 206 use a single unified gamma curve instead of two separate gamma curves that could be slightly different from one another.

In addition, the gamma curve used for the image signal processor 204 and the display processor 206 may be modified to be specific for indoor use. In contrast, image signal processors 204 are typically found in point and shoot cameras that are used indoors and outdoors. Thus, the gamma curves for point and shoot cameras reflect image corrections for both indoor and outdoor lighting conditions.

Figure 3:
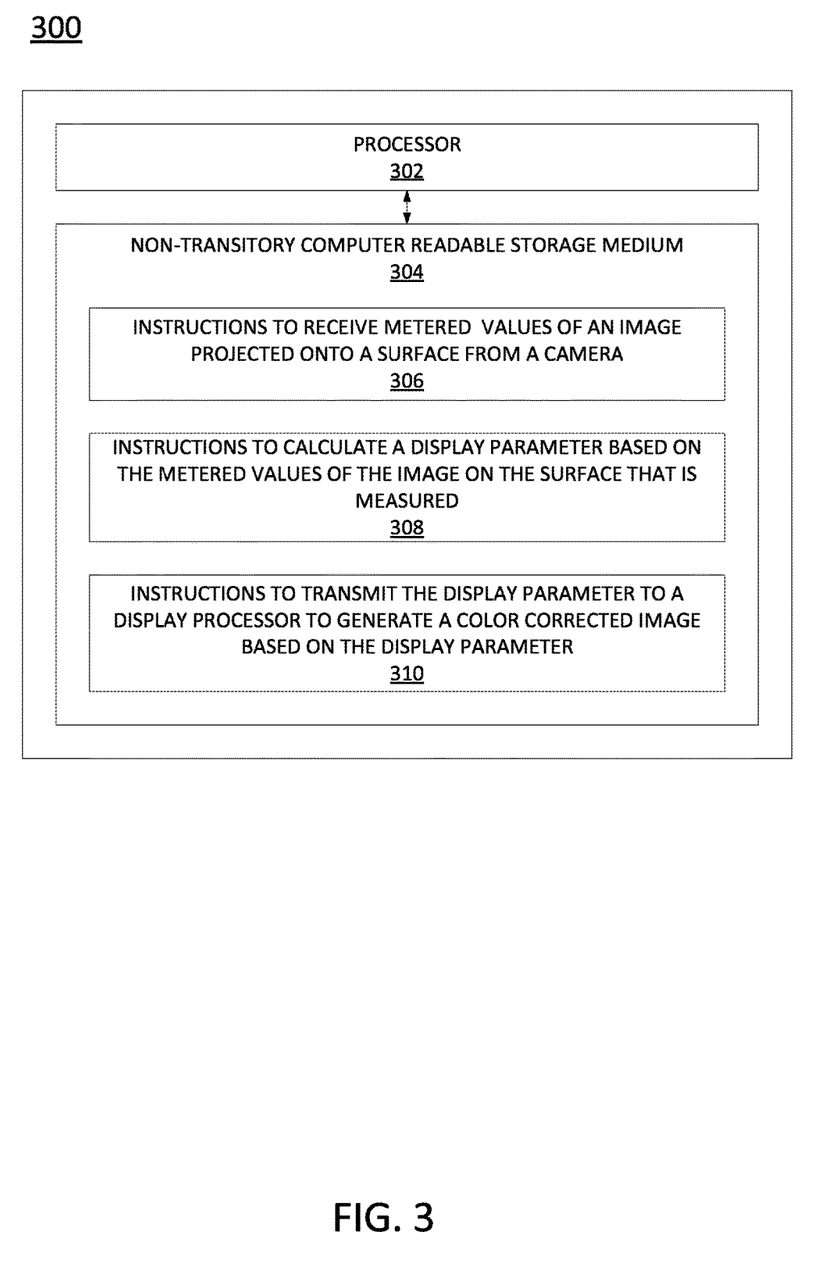
FIG. 3 is another example of an apparatus of the present disclosure.

FIG. 3 illustrates an example of an apparatus 300. In one example, the apparatus may be the image signal processor 204. In one example, the apparatus 300 may include a processor 302 and a non-transitory computer readable storage medium 304. The non-transitory computer readable storage medium 304 may include instructions 306, 308 and 310 that when executed by the processor 302, cause the processor 302 to perform various functions.

In one example, the instructions 306 may include instructions to receive metered values of an image projected onto a surface from a camera. The instructions 308 may include instructions to calculate a display parameter based on the metered values of the image on the surface that is measured. The instructions 310 may include instructions to transmit the display parameter to a display processor to generate a color corrected image based on the display parameter, wherein the color corrected image is transmitted to a projector to display the color corrected image onto the surface. In one example, the display parameter may be a projector display parameters control signal that is sent directly to the projector.

Figure 4:
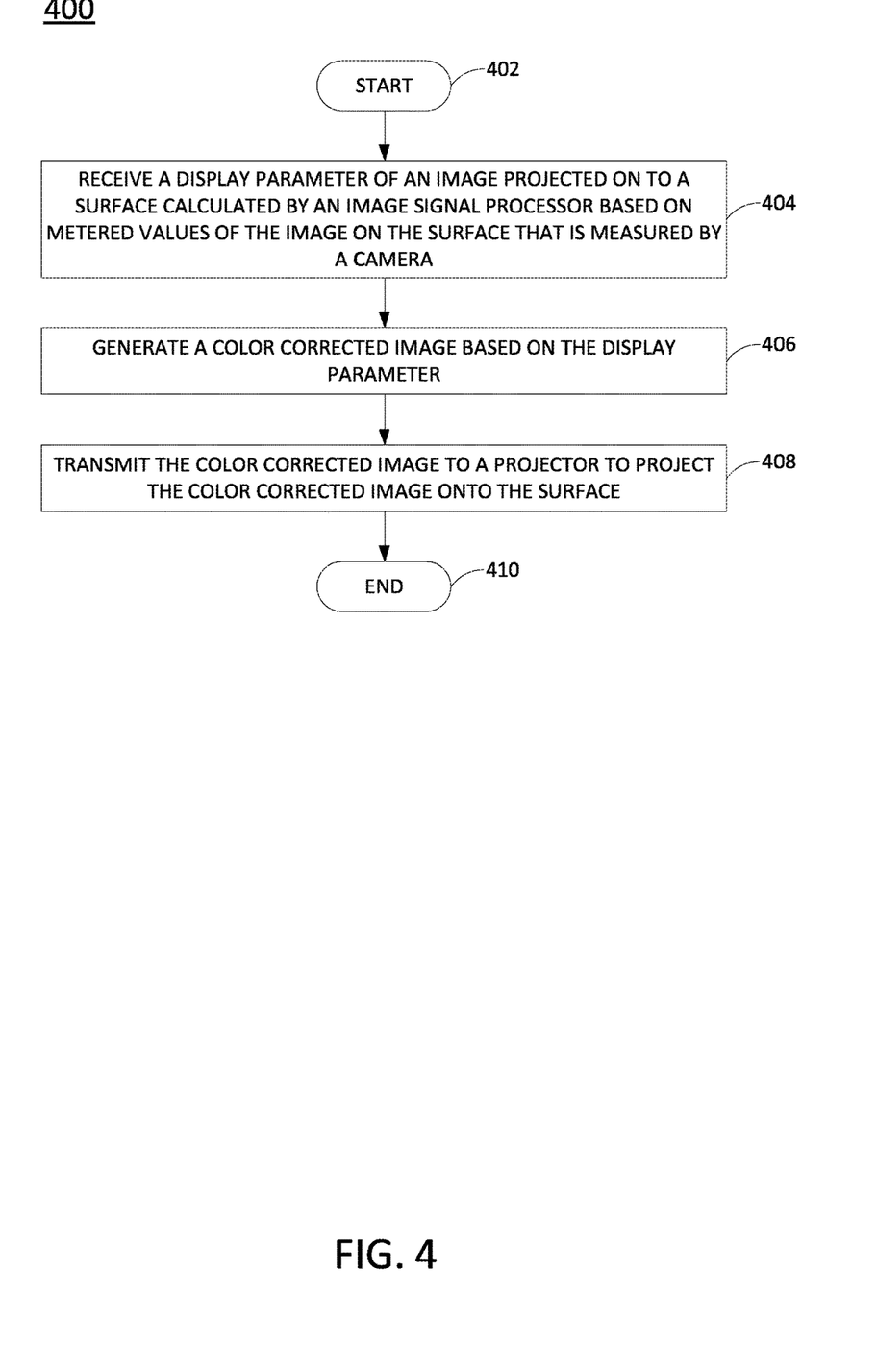
FIG. 4 is a flow diagram of an example method for generating a color corrected image for a projector.

FIG. 4 illustrates a flow diagram of an example method 400 for generating a color corrected image for a projector. In one example, the blocks of the method 400 may be performed by the media hub 102 or the display processor 206.

At block 402, the method 400 begins. At block 404, the method 400 receives a display parameter of an image projected onto a surface calculated by an image signal processor based on metered values of the image on the surface that is measured by a camera. For example, a camera of the media hub, or remote cameras in communication with the media hub, can capture video images and provide measured meter values to an image signal processor. The measured metered values may include luminance values, chrominance values, and the like.

The image signal processor may calculate display parameters based on the measured meter values. The display parameters may include a white balance, a gain, an exposure level, a contrast, and the like. The image signal processor may adjust the display parameters based on a comparison of the display parameters to respective reference display parameters. The display parameters (whether adjusted or not) may then be sent to the display processor.

In some implementations, the image signal processor may calculate the display parameters based on additional factors. For example, the user preferences, the type of video image that is being projected, and the like, may be taken into account when calculating the display parameters.

At block 406, the method 400 generates a color corrected image based on the display parameters. When the image is projected onto a surface that is a non-white color, the display parameters of the image may be distorted. For example, the image may appear to be dull on a tan colored wall, or white images may have a tan hue, and the like. As a result, the display parameters that are calculated from measured metered values may be out of range of a reference display parameter based on the image projected onto a white colored surface.

As a result, the delta between the display parameter and a reference display parameter may be calculated. If the delta is greater than a threshold, the color corrected image may be generated. In some examples, the calculating and generating may be performed continuously. In other examples, the calculating and generating may be performed for a predefined number of frames of the video image captured by the camera (e.g., every 500 frames, every 1000 frames, and the like).

In one example, the color corrected image may be generated by adjusting at least one display setting. For example, a display setting may be adjusted to change the display parameter such that the delta between the display parameter and the reference display parameter is within the threshold.

In another example, the color corrected image may be generated by adjusting the video image directly. For example, a gamma may be changed on an R channel of the video image. In one implementation, the color corrected image may be generated by adjusting at least one display setting and adjusting the video image directly.

At block 408, the method 400 transmits the color corrected image to a projector to project the color corrected image onto the surface. For example, the color corrected image may be transmitted over a wired or wireless connection. In some examples, the color corrected image may be transmitted with display setting changes to change display settings of the projector.

In some implementations, the method 400 may be continuously repeated while the lighting conditions are changing and the media hub is playing the image. In other words, the lighting conditions in the room may gradually change from lighter to darker, or vice versa, and the method 400 may continuously operate to generate the color corrected image. At block 410, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a camera to measure metered values of an image projected onto a surface;
   an image signal processor in communication with the camera to receive the metered values of the image on the surface and to calculate display parameters based on the metered values of the image on the surface that is measured; and
   a display processor in communication with the image signal processor and a projector, the display processor to generate a color corrected image projected onto the surface by the projector when a difference between the display parameters and reference display parameters exceeds a threshold, wherein the color corrected image is generated based on the display parameters.

2. The apparatus of claim 1, wherein the image signal processor generates a projector display parameters control signal in addition to the color corrected image that is generated.

3. The apparatus of claim 1, wherein the image signal processor receives user preferences and a video image to determine a type of video image that is being projected.

4. The apparatus of claim 1, wherein the surface comprises a colored wall.

5. The apparatus of claim 1, wherein the metered values that are measured comprise a chrominance value and a luminance value.

6. The apparatus of claim 1, wherein metered values are continuously measured in changing lighting conditions by the camera.

7. The apparatus of claim 1, wherein the image signal processor and the display processor include a unified gamma curve.

8. A method, comprising:
   receiving, by a processor, a display parameter of an image projected onto a surface calculated by an image signal processor based on metered values of the image on the surface that is measured by a camera;
   determining, by the processor, that a difference between the display parameter and a reference display parameter is greater than a threshold;
   generating, by the processor and in response to the determination, a color corrected image based on the display parameter; and
   transmitting, by the processor, the color corrected image to a projector to project the color corrected image onto the surface.

9. The method of claim 8, wherein the color corrected image is generated for a periodic number of frames.

10. The method of claim 8, comprising:
generating a projector display parameters control signal to adjust at least one display setting of the projector in addition to the color corrected image that is generated.

11. The method of claim 8, wherein the receiving, the generating, and the transmitting are performed continuously in changing lighting conditions while the image is projected onto the surface.

12. The method of claim 8, wherein the surface comprises a colored wall.

13. A non-transitory computer readable storage medium encoded with instructions executable by a processor, the non-transitory computer-readable storage medium comprising:
instructions to receive metered values of an image projected onto a surface from a camera;
instructions to calculate a display parameter based on the metered values of the image on the surface that is measured; and
instructions to transmit the display parameter to a display processor to generate a color corrected image based on the display parameter, the processor and the display processor having a unified gamma curve, wherein the color corrected image is transmitted to a projector to display the color corrected image onto the surface.

14. The non-transitory computer readable storage medium of claim 13, wherein the instructions to receive, the instructions to calculate and the instructions to transmit are performed continuously in changing lighting conditions while the image is being projected onto the surface.

* * * * *

UNITED STATES PATENT AND TRADEMARK OFFICE
CERTIFICATE OF CORRECTION

PATENT NO. : 10,200,662 B2
APPLICATION NO. : 15/749466
DATED : February 5, 2019
INVENTOR(S) : Madhu Sud Athreya et al.

Page 1 of 1

It is certified that error appears in the above-identified patent and that said Letters Patent is hereby corrected as shown below:

On the Title Page

In item (56), FOREIGN PATENT DOCUMENTS, in Column 2, Line 1, delete "10-200600229" and insert -- 10-20060022959 --, therefor.

Signed and Sealed this
Sixteenth Day of July, 2019

Andrei Iancu
*Director of the United States Patent and Trademark Office*